United States Patent [19]

Starosta et al.

[11] Patent Number: 5,438,994
[45] Date of Patent: Aug. 8, 1995

[54] ULTRASONIC DIAGNOSTIC IMAGE SCANNING

[75] Inventors: Mikhail Starosta, Snohomish; David N. Roundhill, Bothell; David W. Rust, Seattle, all of Wash.

[73] Assignee: Advanced Technology Laboratories, Inc., Bothell, Wash.

[21] Appl. No.: 319,757

[22] Filed: Oct. 7, 1994

[51] Int. Cl.⁶ ............................................. A61B 8/00
[52] U.S. Cl. ................... 128/661.01; 73/626
[58] Field of Search ............ 128/660.07, 660.08, 128/661.01; 73/621, 619, 625, 626, 633, 641; 367/7

[56] References Cited

U.S. PATENT DOCUMENTS

| | | | |
|---|---|---|---|
| 4,159,462 | 6/1979 | Rocha et al. | 340/1 R |
| 4,561,308 | 12/1985 | Bele et al. | 73/626 |
| 4,888,694 | 12/1989 | Chesarek | 364/413.24 |
| 4,993,417 | 2/1991 | Sao | 128/661.09 |
| 5,105,813 | 4/1992 | Shikata | 128/660.07 |
| 5,123,415 | 6/1992 | Daigle | 73/625 |
| 5,142,649 | 8/1992 | O'Donnell | 367/7 |
| 5,144,954 | 9/1992 | Satake | 128/661.09 |

*Primary Examiner*—George Manuel
*Attorney, Agent, or Firm*—W. Brinton Yorks, Jr.

[57] ABSTRACT

A technique for scanning an image field with adjacent beams of ultrasonic energy is provided in which initially transmitted beams are transmitted along beam directions down the center of the image field. Subsequent beams are alternately transmitted on either side of the initially transmitted beams and at increasing lateral locations in said field with respect to the locations of the initially transmitted beams until the full image field has been scanned. In a preferred embodiment a waiting period is added to the pulse repetition interval of each transmission to allow time for multipath reflections to dissipate. The waiting periods are longer during initial transmissions in the vicinity of the center of the image field, and decline as beams are transmitted at increasing lateral locations of the field. The scanning technique provides a reduction in multipath reflection artifacts while maintaining a smoothly varying or uniform temporal disparity in the transmission times of adjacent beams.

11 Claims, 5 Drawing Sheets

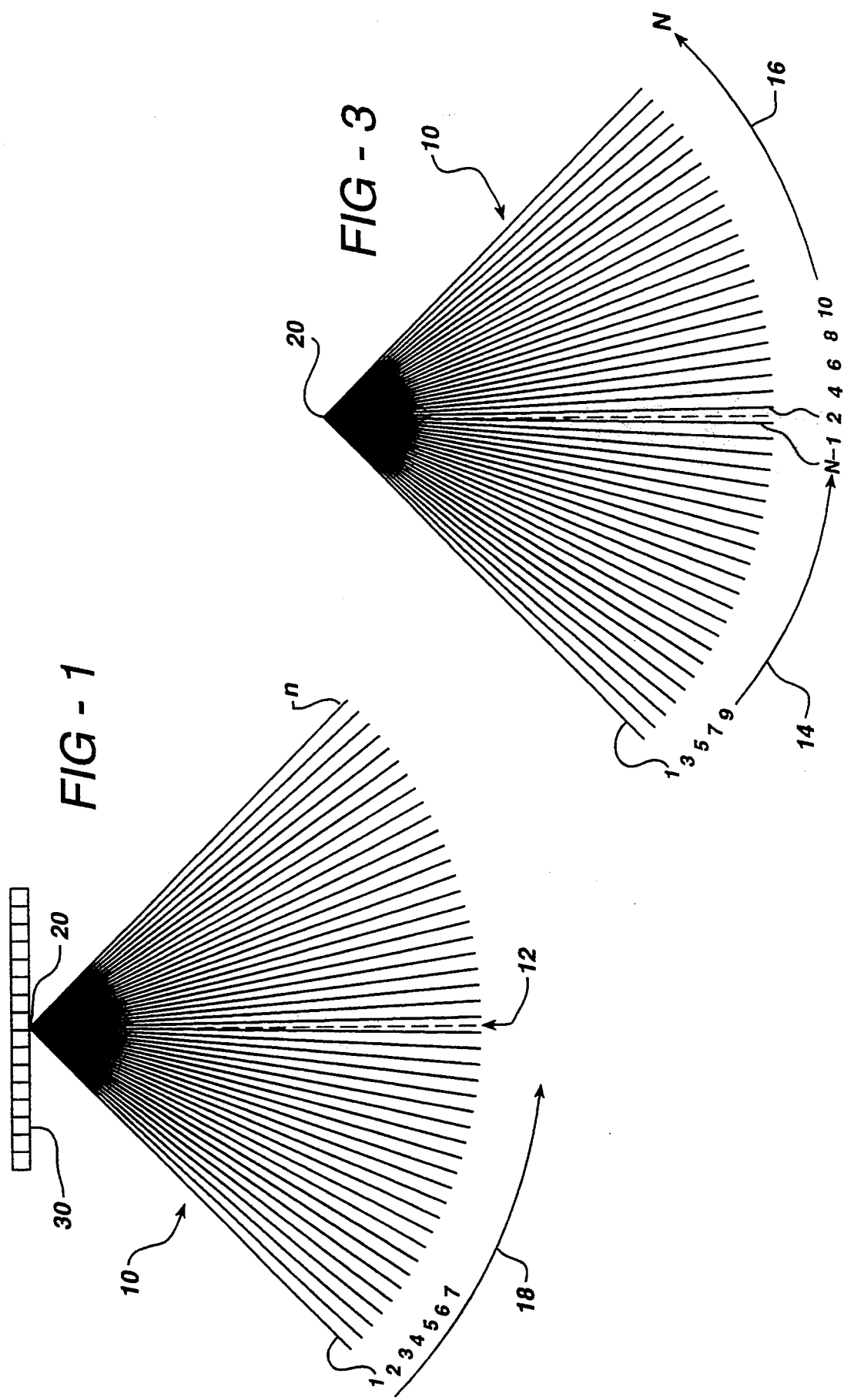

ULTRASONIC DIAGNOSTIC IMAGE SCANNING

This invention relates to improvements in ultrasonic diagnostic imaging techniques, and in particular to ultrasonic image scanning techniques which reduce the effects of multipath reflection artifacts in an ultrasonic image.

Ultrasonic images can suffer from a number of image artifact problems, one of which is due to multipath reflections. Ultrasonic images are developed by transmitting ultrasonic pulses over a range of directions called beam directions which cover an image field of a subject being imaged, such as the interior of the human body. After each ultrasonic beam is transmitted echoes are received from along the beam direction over a predetermined depth of field. These transmission and reception sequences are repeated until beams have been scanned over and echoes gathered from along beam directions which cover the desired image field. By computing the time of flight of ultrasonic pulses and echoes together with the beam directions, the locations of specific echoes received from the image field are determined. After all of the echoes from the beams of the image field have been received and so arranged in an image format, the resultant ultrasonic image is displayed on a monitor.

It may be seen that the time required to produce an ultrasonic image is determined by the number of beams comprising the image and the sum of the times required to transmit each beam and receive the resulting echoes. Each transmit-receive sequence is followed by another in a different beam direction until the entire image field has been scanned and echoes recorded. If for instance one transmit-receive sequence, including switching time and waiting time as discussed herein, requires 350 μsec. to complete and there are 200 such beams, an entire field can be scanned in 70 msec. Image frames can thus be acquired at the rate of 14 frames per second.

While this frame rate may be acceptable for some applications, low frame rates can cause a disturbing flicker or hesitation in the real time display of images. Moreover, it is often desirable to increase the number of scan lines in the image to improve image quality, further reducing the frame rate. Furthermore, the transmitted image beams are often interlineated in time with narrow band Doppler pulse transmission and reception sequences for the simultaneous display of a structural image with flow information. The complete set of image and Doppler sequences can cause the time to assemble one display frame to increase substantially, and a commensurate significant decline in the frame rate of display.

These considerations have led to efforts to reduce the time of the transmit-receive imaging sequences in various ways. Attempts to reduce the scanning time have often focused on overlapping two transmit-receive sequences in time, generally by transmitting a pulse in first and second beam directions, receiving echoes from the first beam direction and then the second. This generally requires the use of separate subgroups or subapertures of a transducer array, such as the linear array subaperture sequencing shown in U.S. Pat. No. 4,561,308 (Bele et al.)

The problem encountered by these approaches is that the transducers receiving echoes from one beam direction can also be receiving echoes resulting from the pulse transmission in the other beam direction. The possibility of such cross contamination of the received signals is heightened whenever the pulse sequencing falls below the full round trip time of a pulse and its echoes. Moreover, the inadvertent reception of echoes caused by other than the intended transmitted pulse is possible even when the full round trip time is observed. This is due to what is referred to as multipath reception. Multipath reception arises when a first pulse is reflected by structure so as to continue to travel through the image field, generating echoes and itself even returning to the transducer, during the reception period of a subsequent transmit-receive sequence.

A simple example will illustrate the problem. Suppose that a first pulse is transmitted in a beam direction toward the center of a chamber of the heart. Echoes will thereafter be received from along the beam direction and a second pulse is transmitted toward the heart in an adjacent beam direction. As the receiver prepares for reception of echoes from along the second beam direction the original pulse continues to travel and is partially reflected by the far wall of the heart. This reflection is now traveling back toward the transducer, propagating other echoes as it goes, and eventually the reflection reaches the near wall of the heart, from which it is partially reflected outward again. Spurious echoes created by these multiple reflected waves can eventually travel back to the transducer, where they are received along with the valid echoes from the second beam direction. A number of such reflections are possible, passing back and forth over multiple paths in the image field and generating spurious echoes as they travel. These spurious echoes appear as artifacts in the resulting image field.

It may be seen that multipath reception artifacts can be significant when transmit-receive sequences overlap in time. In fact, it is sometimes necessary to reduce these artifacts by allowing time between sequences during which the multipath reflections become attenuated and dissipate. This is done by allowing a user to insert a waiting period of a selected length after reception of echoes and prior to the next pulse transmission. During the waiting period the repeated reflections will become attenuated by their passage through the subject being imaged. The control mechanism for setting the waiting period between sequences is usually a pulse rate interval (PRI) control which is set by the user or automatically by the ultrasound system depending upon the procedure requested. It may be appreciated that increasing the PRI to diminish these artifacts will cause an increase in the time required to assemble an image frame, and a consequent further reduction in the image frame rate.

In accordance with the principles of the present invention, a sequence of spatially scanning an ultrasonic sector image field is provided which provides a reduction in multipath artifacts in the received echo signals. The scanning sequence is performed by symmetrically scanning beam directions alternately on respective sides of the sector. The sequence begins by scanning the two central beam directions of the sector. The sequence continues by scanning outwardly from the two central beams in arcuately divergent directions, alternating from one side of the sector to the other. The last two beams scanned are the two most lateral beam directions. To reduce multipath reception artifacts in the center of the sector a relatively long pulse repetition interval may be inserted between the transmit-receive sequences of the central beam directions, where consecutive beam scans are most closely adjacent. As the scanning sequence diverges from the center of the sector and consecutively transmitted beams become more widely separated in space, the PRI can be reduced to increase the frame rate. In an alternate embodiment the scanning sequence first diverges from the center of the sector then converges, the sequence proceeding alternately outward from the sector center during one frame then back again during the next frame.

In the drawings:

FIG. 1 illustrates a conventional sequential sector scanning sequence;

FIG. 3 illustrates a sequence of alternately transmitting beams over the two halves of a sector to achieve uniform temporal beam separation on each side of the sector;

Figure 2A:
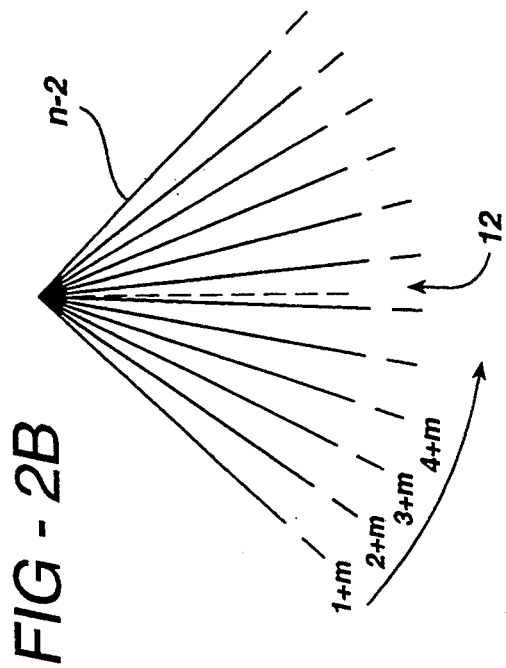
FIGS. 2a–2e illustrate a time interleaved beam scanning sequence in which successive beams are temporally separated.

Referring first to FIG. 1, a conventional sector scanning sequence is illustrated. The image sector 10 comprises n scan lines along which focused ultrasound pulses are transmitted and from which echoes are received by an ultrasonic transducer 30 located at or in the vicinity of the apex 20 of the sector. The transducer 30 in this example is a multielement transducer which can be electronically focused as is known in the art on both transmit and receive. The sector area 10 which is covered by the successively transmitted beams is seen to be in the shape of a section of a circle and is drawn with a center line 12. The n transmitted beams are distributed on either side laterally of the illustrated center line 12.

Successive beams are transmitted as shown by beams numbered 1, 2, 3, and so forth beginning at the left lateral side of the sector. After a pulse is transmitted in each beam direction there is a reception period during which echoes are received by the transducer from along the beam direction. After echoes have been received from the greatest distance from the transducer in a given beam direction the receiver is turned off and the transducer's control system is readied for transmission in the next beam direction. Transmission and reception continues in this sequence and ends with the beam identified as n at the right lateral side of the sector.

It is seen in FIG. 1 that each successive beam direction is immediately adjacent to the previous beam direction. Thus, if multipath reflections are passing back and forth along a given beam direction they will most likely be overlapping the adjacent beam direction along which echoes are next to be received. There is a high likelihood that multipath reflections will be received and artifacts created when the transducer is activated to begin receiving from along the adjacent beam direction.

To overcome such multipath reception with this scanning sequence, a waiting period is inserted following each transmit-receive sequence. After echoes have been received from the maximum desired depth along one beam direction, the transmitter is inhibited for a waiting period which, together with the transmission and reception time, are referred to as the pulse repetition interval, or PRI. During the waiting period of the PRI the multipath reflections will become attenuated by passage through the subject. After waiting for a time during which the intensity of these reflections diminishes to the desired low level, the next transmit-receive sequence begins in the next beam direction. By waiting for an appreciable waiting period, such multipath artifacts can be significantly reduced, but at the expense of a corresponding significant increase in the time needed to scan all beam directions and a consequent reduction of the image frame rate, the rate at which newly acquired, fully assembled images can be displayed.

The effect of an appreciable waiting period on the frame rate of display can be appreciated by considering a numerical example. The velocity of ultrasound through tissue is approximately 1540 meters/sec. When a human subject is being scanned, this velocity dictates that approximately 200 $\mu$sec. are required for an ultrasound pulse to travel along a beam direction to a depth of 15 cm., for example, and for an echo to return from that depth. If 200 beam directions are scanned across the sector, it will take approximately 40 msec. to scan the entire sector. Thus the frame rate of display will be about 25 frames per second.

If it is found that a waiting period of 200 $\mu$sec. is required for the effects of multipath reflections to dissipate, the waiting period between transmit-receive sequences is set at 200 $\mu$sec., doubling the PRI. The time required to scan all 200 beam directions with this waiting period is now 80 msec. The time required to reduce multipath reflection artifacts has caused the frame rate to drop to about 12.5 frames per second.

FIGS. 2a–2e show one approach to reducing the problem of multipath reflection artifacts, which is to scan the sector in a spatially interleaved manner. In FIG. 2a, beam directions numbered 1, 2, 3, 4, indicate the scanning of these beam directions sequentially in time. Spatially, however, these beam directions are each separated by three other beam directions. Thus, only every fourth beam direction across the sector is scanned. The final beam direction scanned in FIG. 2a is beam direction n-3.

Figure 2B:
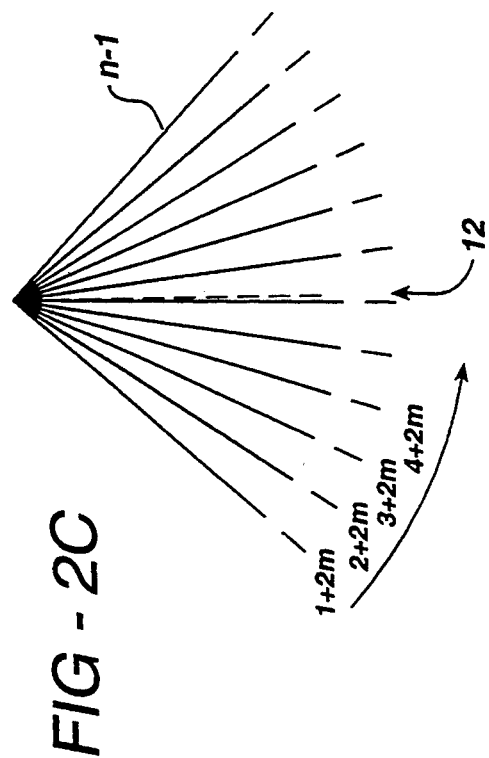

Immediately thereafter the sector is again scanned by scanning every fourth beam direction, but this time beginning with the second beam direction identified in FIG. 2b as 1+m. Beam direction 1+m is spatially adjacent to the first beam direction 1 of FIG. 2a. However, this beam direction is scanned only after one-quarter of the beam directions have been scanned in FIG. 2a. Since n/4 transmit-receive sequences have transpired between the scanning of beam direction 1 and the adjacent beam direction 1+m, a substantial amount of time has passed, during which multipath reflections in the vicinity of beam direction 1 have dissipated. Multipath artifact effects will be substantially reduced. The same is true for beam direction 2+m, which is immediately adjacent to beam direction 2, for beam direction 3+m which is immediately adjacent to beam direction 3, and so forth.

Figure 2C:
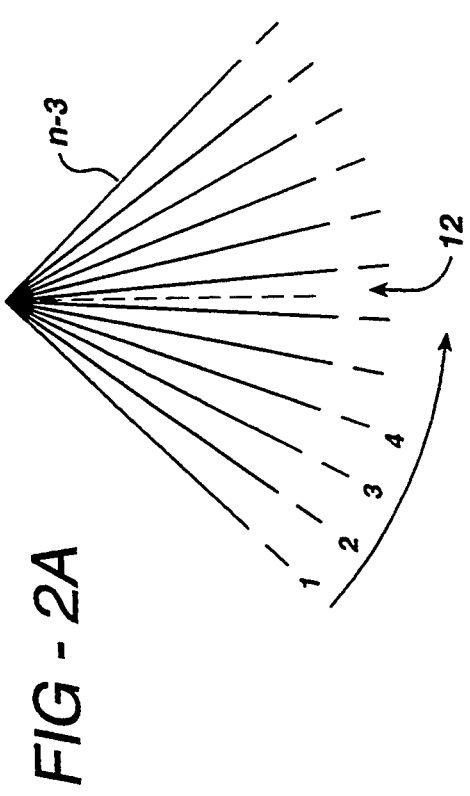
Figure 2E:
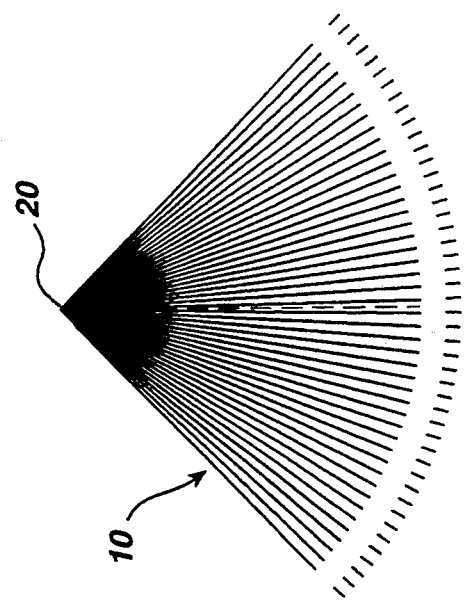
Figure 2D:
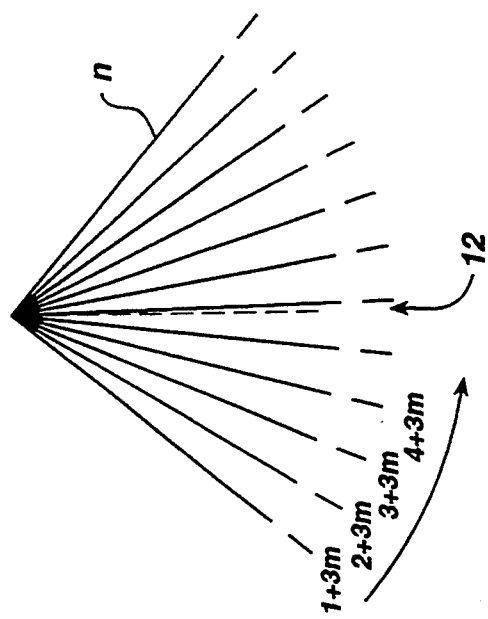

Scanning every fourth beam direction continues in the same manner as shown by FIGS. 2c and 2d. In these figures every fourth beam direction is scanned beginning with the third beam direction (1+2m) and the fourth beam direction (1+3m), respectively. After all of these beam directions have been scanned, the acquired lines of echoes may be interleaved in the sector display format as shown in FIG. 2e.

Scanning every fourth beam direction in this manner helps to spatially separate the current beam direction from multipath reflections occurring along the previously transmitted line. However, the four beam separation of successively transmitted beams may not be fully sufficient to prevent multipath reflections.

Moreover, this effort to reduce artifacts from multipath reflections can cause its own inherent artifact, which is temporal banding. This scanning sequence will result in a substantial passage of time between the scanning of adjacent beam directions. For instance, the beam direction 2 in FIG. 2a is scanned a full three quarters of the frame scanning time prior to the scanning of its adjacent beam direction 2+3m in FIG. 2d. This significant temporal disparity between the scanning of spatially adjacent lines can cause each group of four beams to take on a uniquely distinct appearance, causing the image to exhibit a pattern of vertical bands where the temporal disparities between adjacent beams are the greatest. This effect can be distracting to an observer of the image who is trying to discern small image details and make a diagnosis from such details.

A similar technique for reducing multipath reflection artifacts is shown in the scanning sequence of FIG. 3. In this figure there are N beam directions which are scanned in the sequence of the illustrated beam numbering. The lateral beam direction 1 is scanned first. The second beam direction to be scanned is the beam direction 2 which is to the right of the center line of the sector 10. The third beam direction to be scanned is numbered 3, spatially adjacent to beam 1. The fourth beam direction scanned is labeled 4, spatially adjacent to beam 2. The sequence continues in this manner, alternating between the previously scanned beam directions of each half of the sector, and ending with the scanning of beam directions N-1 and N.

This approach reduces multipath reflection artifacts by causing consecutively scanned beam directions to be spatially half a sector apart. Multipath reflections along beam direction 1, for example, should have little effect on echoes received immediately thereafter from along beam direction 2. The temporal disparity between the scanning of adjacent lines is uniformly established at two PRI's. Beam direction 3 is scanned two PRI's after beam direction 1, beam direction 5 is scanned two PRI's after beam direction 3, and so forth. The vertical banding effect exhibited by the scanning sequence of FIG. 2e is overcome by this temporal uniformity in the scanning of spatially adjacent lines.

This technique creates a significant temporal disparity at the center of the sector, however. There it is seen that beam direction 2, which is the second beam direction scanned, is scanned almost a full frame interval prior to adjacent beam direction N-1, which is the second-last beam direction scanned. While each half of the sector will have a pleasing appearance, there will be a distinct vertical banding down the center of the sector by reason of the sharp temporal disparity in the scanning of the adjacent central beam directions. Images scanned by this technique are often referred to as "dual wiper" images, as the vertical banding down the center will give the appearance of an automobile windshield which has been swept by two windshield wipers.

Figure 4:
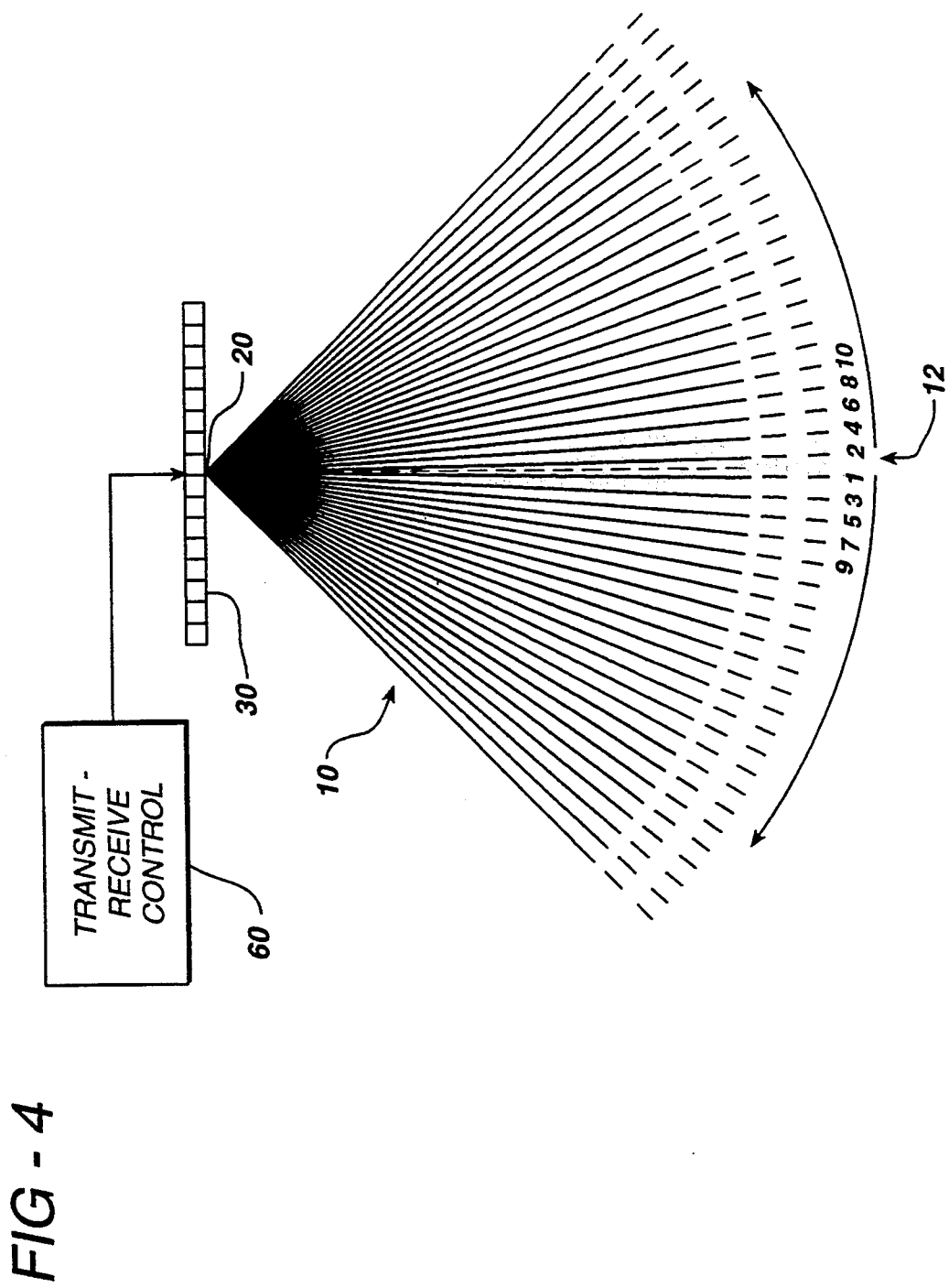
FIG. 4 illustrates a divergent beam scanning sequence in accordance with the principles of the present invention.

These deficiencies of the prior art are addressed by the scanning technique of the present invention which is shown in FIG. 4. In FIG. 4 the timing of a transducer array 30 is controlled by a transmit-receive controller 60. The scanning sequence of the present invention begins by scanning the two beam directions 1 and 2 on either side of the center line 12 of the sector 10. After beam direction 2 on the right side of the sector has been scanned, the beam direction 3 to the left of beam direction 1 is scanned. This is followed by the scanning of beam direction 4 to the right of beam direction 2. It is seen that the scanning sequence proceeds laterally from the center of the sector and alternates back and forth from one side of the sector to the other.

It is first seen that the inventive scanning technique preserves a temporal uniformity in the scanning of spatially adjacent beam directions. Each beam direction is scanned two PRI intervals apart from its spatial neighbors. The vertical banding effects seen with FIGS. 2a–2e and 3 have been overcome by this temporal uniformity from one spatial beam direction to the next.

Furthermore, the problem of multipath reflection artifacts has been markedly reduced by the two PRI intervals between spatially adjacent beam directions. Multipath reflections have a two PRI period of time to dissipate before a spatially adjacent beam direction is scanned.

The deficiencies of the prior art techniques are seen to be overcome everywhere except at the center of the sector, for there it is seen that spatially adjacent beam directions 1 and 2 are scanned in succession. Furthermore, there is not a significant spatial separation between the nearest lateral beam directions, such as beam directions 3 and 4.

Figure 5:
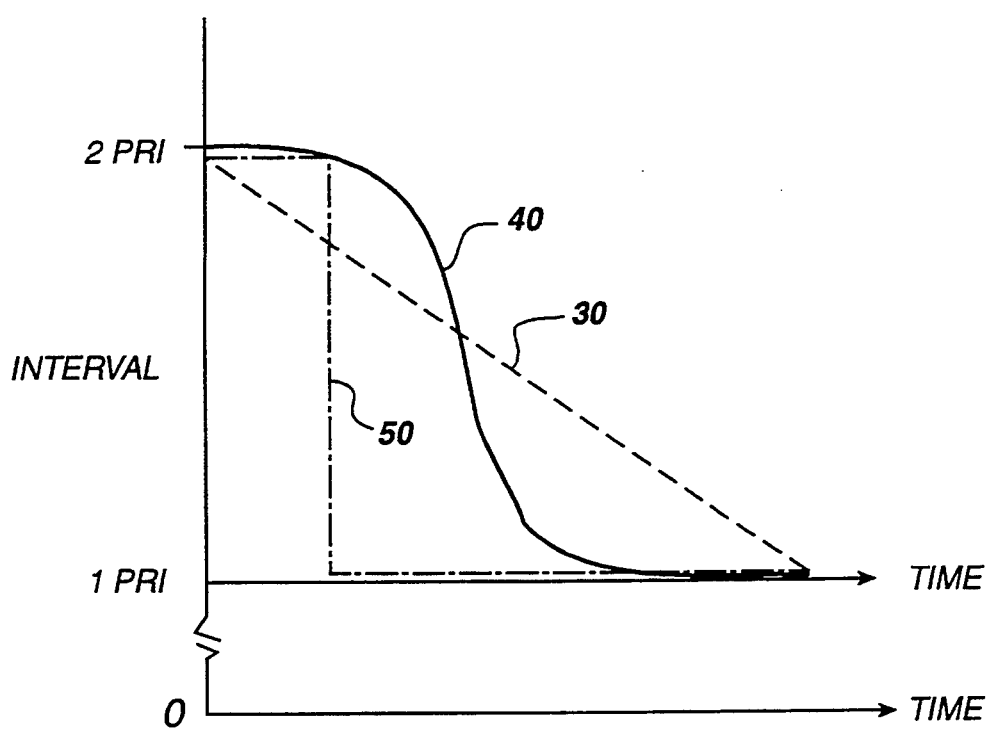
FIG. 5 illustrates a PRI versus time plot for controlling the PRI during divergent beam scanning in accordance with the principles of the present invention.

But these apparent drawbacks may be addressed by using a greater PRI at the center of the sector than at lateral areas of the sector as illustrated by the graph of FIG. 5. This graph shows techniques for varying the PRI over the time interval that the full sector is scanned. Since beam directions 1 and 2 are spatially adjacent to each other, the dashed line 30 shows that a full waiting period of one PRI is inserted between the transmit-receive sequences of these two lines. During this one PRI waiting period multipath reflections in the vicinity of beam direction 1 are given a full PRI interval to dissipate before adjacent beam direction 2 is scanned. As the consecutively scanned beams move further and further apart spatially, this waiting period is reduced toward zero at a time when it is no longer needed. Dashed line 30 shows a smooth linear reduction in this PRI interval over time from one sequence to the next.

Alternately, as broken line 50 in FIG. 5 shows, calculations and experience may show that the waiting periods are not needed after a given period of time. This broken line shows the maintenance of a full PRI interval waiting period between the initial time consecutive sequences, and a sudden change to no additional waiting time when consecutively scanned beams exhibit sufficient spatial separation and no longer benefit from the additional PRI interval. It has been found, however, that a vertical band may appear in each half of the sector between those beam directions where the shift in PRI occurred.

A preferred waiting period variation is shown by the curve 40 in FIG. 5. This curve shows the maintenance of a waiting period of about a full PRI interval between beam scanning sequences in the vicinity of the center of the sector. Shortly thereafter, however, there is a smooth but rapid decline in the waiting period between consecutively scanned beam directions. The waiting period decline quickly reaches zero, after which there is no waiting period between consecutively scanned beams and a uniform one PRI interval is established between the scanning times of time consecutive beams, resulting in two PRI intervals between the scanning times of the remaining adjacent beams. This PRI variation technique has been found to yield a beneficial balance between multipath artifact reduction and maintenance of a relatively high frame rate.

It may be appreciated that as the lateral extremities of the sector are approached, it may be possible to even drop below the one PRI repetition rate between time consecutive pulses. As echoes are received from the left side of the sector, for instance, the next pulse could be transmitted to the right before reception of echoes from the left side beam direction has been completed.

A variation of the inventive scanning sequence is to scan outwardly from the center of the sector during one image frame, then inwardly from the lateral edges of the sector during the next successive frame. The sequence alternates back and forth between inward and outward scanning during successive image frames. While providing the benefits enumerated above for the preferred embodiment, this variation has the characteristic of a frame to frame variation in the temporal scanning of each beam direction. After the central beam directions 1 and 2 have been scanned at the beginning of the scanning period for the first frame, almost two frame intervals pass before they are scanned at the end of the second frame scanning period. These beam directions are then scanned immediately thereafter at the beginning of the third frame scanning period. Consequently, this varying sequence may not be as completely free of the effects of temporal scanning nonuniformity as the preferred embodiment.

While the present invention has been described in terms of a sector comprising a radial array of beam directions, it will be appreciated that the inventive scanning sequence is also applicable to other scanning formats such as the rectangular format of a linear scan. In the linear format, the ultrasonic beams are transmitted in parallel directions from groups of transducer elements of a linear transducer array. The linear scan will proceed in the same manner as the sector scan, beginning with the two central beams and proceeding alternately to scan beam directions on either side of the two initial beam directions. Trapezoidal and other beam patterns are also possible.

What is claimed is:

1. A method for scanning an image field with pulses of ultrasonic energy which are transmitted in a plurality of beam directions extending spatially adjacent to each other over said image field from one lateral extreme of said image field to an opposite lateral extreme, comprising:

transmitting in a first beam direction and then in a second beam direction which directions are substantially centrally located in said image field; and thereafter transmitting in a third beam direction which is lateral to said first beam direction and then in a fourth beam direction which is lateral to said second beam direction; and then continuing to scan said image field by transmitting in beam directions which are alternately on opposite lateral sides of previously transmitted beam directions.

2. The method of claim 1, wherein said beam directions spatially radiate from a common point in a sector format.

3. The method of claim 1, wherein said beam directions spatially extend in parallel to each other.

4. The method of claim 1, further comprising the step of controlling the times of transmission of said ultrasonic pulses wherein the time intervals between transmission in said first and second beam directions are greater than the time intervals between transmission of pulses at the lateral extremes of said image field.

5. The method of claim 4, further comprising the step of receiving ultrasonic echoes from said respective beam directions for a predetermined period of time following said respective pulse transmissions.

6. The method of claim 5, further comprising the step of controlling the times of transmission of said ultrasonic pulses includes inserting relatively longer waiting periods of time following reception of ultrasonic echoes after transmission in said first and second beam directions and inserting relatively shorter waiting periods of time following reception of ultrasonic echoes at the lateral extremes of said image field.

7. The method of claim 6, wherein said waiting period of time following reception of ultrasonic echoes at the lateral extremes of said image field are substantially zero periods of time.

8. The method of claim 7, wherein the step of controlling the times of transmission of said ultrasonic pulses further comprises inserting waiting periods of time following reception of ultrasonic echoes after transmission in said third and fourth beam directions which are shorter than the waiting periods of time following reception of ultrasonic echoes after transmission in said first and second beam directions, and longer than the waiting periods of time following reception of ultrasonic echoes at the lateral extremes of said image field.

9. Ultrasonic apparatus for scanning an image field of a subject extending in substantially opposite directions from the middle of said image field to lateral extremes of said field with beams of ultrasound which are transmitted in a pattern in which the beams are spatially adjacent to each other over said image field comprising:

means for sequentially transmitting first and second ultrasonic beams adjacent to each other down the middle of said image field; and means for sequentially transmitting subsequent beams alternately on either side of said first and second ultrasonic beam locations, wherein successive beam paths are located at increasing lateral locations with respect to the locations of said first and second ultrasonic beam locations.

10. The ultrasonic apparatus of claim 9, further comprising means for varying the intervals of time between transmission of time sequential beams from relatively greater intervals between beams transmitted in the vicinity of the middle of said image field to relatively lesser intervals between the times of successive transmission of more laterally located beams.

11. The ultrasonic apparatus of claim 10, further comprising means for sequentially transmitting subsequent beams alternately on either side of said first and second ultrasonic beam locations, wherein successive beam paths are located at decreasing lateral locations with respect to the locations of said first and second ultrasonic beam locations.

* * * * *